Aug. 26, 1952     W. S. PIERCE, JR     2,608,451

CUSHIONED BEARING AND BUSHING THEREFOR

Filed March 27, 1948

INVENTOR
Winslow S. Pierce Jr.
BY
Pennie, Edmonds, Morton & Barrows
HIS ATTORNEYS Patented Aug. 26, 1952

2,608,451

UNITED STATES PATENT OFFICE 2,608,451

CUSHIONED BEARING AND BUSHING THEREFOR

Winslow S. Pierce, Jr., Dublin, N. H., assignor to Split Ballbearing Corporation, Lebanon, N. H., a corporation of New Hampshire Application March 27, 1948, Serial No. 17,422

3 Claims. (Cl. 308—184)

This invention relates to bearings and more particularly concerns a resiliently cushioned shaft bearing and a resilient bushing structure therefor.

Bearing structures for rotatably supporting line shafting and various other rotary shafts usually include an inner bearing part or "race" which is non-rotatably secured to the shaft and which rotatably engages and is supported by suitable bearing means such as an outer journal or, in the case of anti-friction bearings, a series of balls or other anti-friction members borne in an outer race. To simplify the application of such bearings to long line shafts or other shafts in installations where the shaft ends are not accessible, it has been proposed to form the inner race in two halves or parts and to clamp these parts about the shaft at the desired point. Since the material employed in forming bearing races is tempered steel, the parts of the race cannot be deformed to any appreciable extent by the clamping means, and accordingly a given size of race can be clamped to one size shaft only. Furthermore, shaft diameters vary slightly due to inaccuracies in machining and to wear, and if a tight and continuous fit between the race and shaft surfaces is to be obtained, a separate bearing race must be constructed for each installation. Also, once the bearing race is clamped to the shaft it cannot be subsequently tightened to compensate for shaft wear.

To overcome the above noted difficulties, it is proposed in accordance with the present invention to provide an improved split bearing construction incorporating a split elastically resilient bushing interposed between the inner bearing race and the shaft. The invention also includes an improved form of resilient bushing for use with a split bearing of the type described.

In describing the invention in detail, reference will be made to the accompanying drawing in which an embodiment thereof is illustrated. In the drawings.

Figure 1:
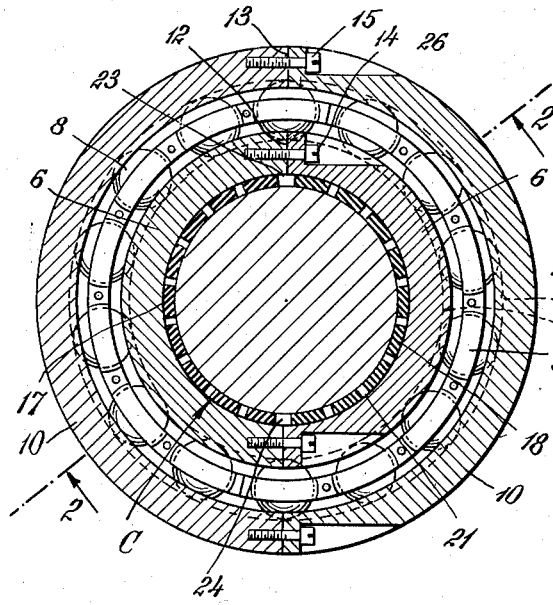
Fig. 1 is a transverse cross sectional view of a bearing structure embodying the invention taken along the line 1—1 of Fig. 2.
Figure 2:
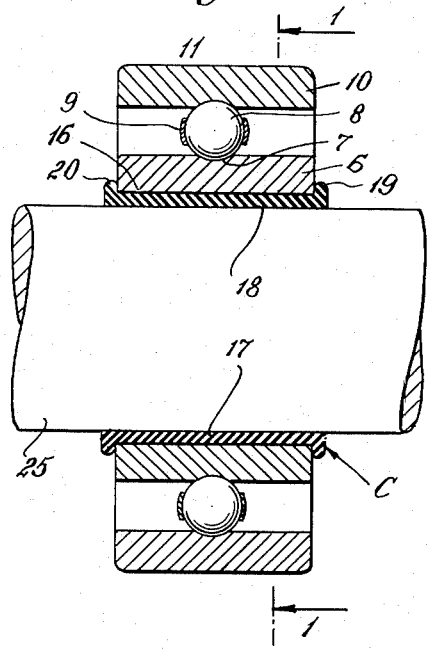
Fig. 2 is a sectional view taken along the line 2—2 of Fig. 1 and viewed in the direction of the arrows.

As shown in the drawing, a split ball bearing structure incorporating the invention includes an inner race 6 having a groove 7 therein for the reception of anti-friction balls 8 which may be carried by a ball cage 9. An outer race 10 has an internal groove 11 for the reception of the bearing balls as shown. The outer race 10 may be fixed to and supported by any suitable means. The inner and outer recess 6 and 10 each comprise two halves respectively split along the lines 12 and 13 and secured about the shaft 25 by suitable means such as the screws 14 and 15. The ball cage 9 is also split along the line 26 so that it can be assembled about an intermediate point in the shaft.

Within the inner race 6 and compressed between its inner surface and the surface of the shaft 25 is a resilient bushing C formed of two substantially semi-cylindrical parts 17 and 18. These bushing parts are formed of elastically resilient compressed material, and preferably of natural or artificial rubber. Radially extending beads 19 and 20 are formed at the opposite ends of the bushing parts and extend radially outward to overlap the ends of the inner race 6 to hold the bushing parts in proper alignment with the inner race against relative movement longitudinally of the shaft.

Figure 3:
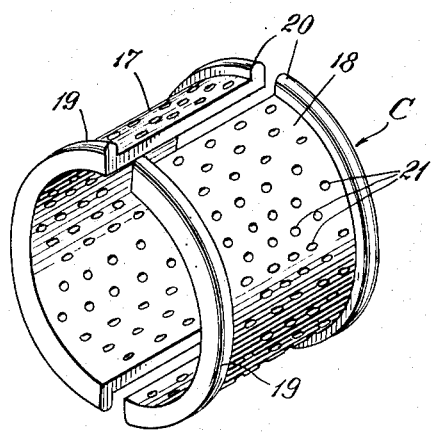
Fig. 3 is a perspective view showing a bearing cushioning bushing embodying the invention.
Figure 4:
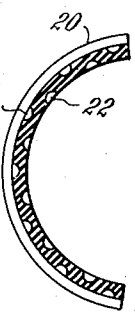
Fig. 4 is a sectional view of a modified form of cushioning bushing.

In order to permit resilient flow of the rubber or like material forming the bushing parts 17 and 18, a plurality of openings or voids are formed therein. As shown in Fig. 3, these openings may take the form of holes 21 extending substantially radially through the cylindrical walls of the bushing parts. In a modified construction shown in Fig. 4, the openings take the form of depressions or dimples 22 formed in the inner and outer cylindrical surfaces of the bushing parts and extending only part way through the bushing part walls. Either type of opening permits resilient flow of the resiliently compressed bushing material and avoids the relatively hard and unyielding properties of rubber or like materials when completely or substantially completely confined against flow. The openings 21 or 22 are preferably substantially uniformly distributed in the bushing halves as shown.

The bushing parts 17 and 18 are each somewhat shorter than 180° in circumferential extent, and when assembled about the shaft 25 their adjacent ends are spaced apart and form open grooves 23 and 24 therebetween. The halves of the inner bearing race 6 are so assembled about the bushing parts that the split lines 12 extend along these open grooves 23 and 24, and in this way the pinching of the bushing material between the inner race halves during assembly is avoided.

To facilitate the assembly of the improved bearing, the bushing parts 17 and 18 may be respectively secured to the inner surfaces of the two halves of the inner bearing race 6 by means of cement or by vulcanizing the rubber bushing parts directly to the bearing half surfaces, as indicated at 16. The bushing parts are thus secured in the positions shown in Fig. 1 to provide the open grooves 23 and 24 at the positions explained above.

My improved cushioned bearing structure provides a firm and continuous clamping connection between the inner split race 6 and the shaft 25 despite minor differences in diameter between these parts or irregularities in the diameter of the shaft. Due to the bushing, wear of the shaft by rocking or other movement of the hard inner race thereon is eliminated. The bushing absorbs and insulates the bearing from radial and transverse shocks and so minimizes or eliminates bearing breakage. Due to its split construction, the bushing may be readily assembled with the bearing about the shaft when the shaft ends are not accessible.

I claim:

1. In a device of the character described, in combination with a shaft, a two-part split bearing race surrounding the shaft and a split bushing compressed between the race and the shaft comprising two substantially semi-cylindrical parts of elastically resilient material having a plurality of openings therein uniformly distributed throughout such parts to permit the resilient flow of such material, the adjacent ends of said bushing parts being spaced apart circumferentially of the shaft to form grooves therebetween in radial alignment with the lines of division between the bearing race parts.

2. In a device of the character described, in combination with a shaft, a two-part split bearing race surrounding the shaft and a split bushing compressed between the race and the shaft comprising two substantially semi-cylindrical parts of rubber each having a plurality of substantially uniformly distributed openings therein to permit resilient flow of the rubber under compression, and integral end flanges on said bushing parts extending radially outward in overlapping relation with the ends of said bearing race, the adjacent ends of said bushing parts being spaced apart circumferentially of the shaft to form grooves in radial alignment with the lines of division between the bearing race parts.

3. In a device of the character described, a two-part split bearing race and a two-part split bushing comprising two substantially semi-cylindrical parts of elastically resilient material respectively secured to the inner cylindrical surfaces of the bearing race parts, said bushing parts having a plurality of openings uniformly distributed throughout them to permit the resilient flow of the bushing material when the bushing is clamped between the bearing race and a shaft.

WINSLOW S. PIERCE, Jr.

REFERENCES CITED

The following references are of record in the file of this patent:

UNITED STATES PATENTS

| Number | Name | Date |
| --- | --- | --- |
| 404,300 | Perkins | May 28, 1889 |
| 1,340,310 | Wolff | May 18, 1920 |
| 1,948,473 | Marshall | Feb. 20, 1934 |
| 1,959,256 | Zerk | May 15, 1934 |
| 2,238,435 | Perry | Apr. 15, 1941 |
| 2,467,530 | Johnson | Apr. 19, 1949 |

FOREIGN PATENTS

| Number | Country | Date |
| --- | --- | --- |
| 525,432 | Great Britain | Aug. 28, 1940 |
| 712,677 | France | Oct. 7, 1931 |